3,531,448
PROCESS FOR REMOVAL OF HYDROGENATION
CATALYST FROM HYROGENATED POLYMERS
Marvin M. Johnson, Bartlesville, Okla., assignor to Phillips
Petroleum Company, a corporation of Delaware
No Drawing. Filed Nov. 6, 1968, Ser. No. 773,953
Int. Cl. C08d 5/02; C08f 27/25
U.S. Cl. 260—85.1                                     5 Claims

ABSTRACT OF THE DISCLOSURE

The removal of hydrogenation catalyst residue from hydrogenated thermoplastic or elastomeric polymers in solution is readily achieved by treating the hydrogenated, catalyst-containing polymer solution with an aqueous solution of an ammonium phosphate prior to separation.

BACKGROUND OF THE INVENTION

Hydrogenation of unsaturated polymers such as unsaturated rubbers with a homogeneous catalyst system formed by reducing an organo transition metal with a trihydrocarbylaluminum is known, and is shown, for example, in U.S. Pat. 3,113,986, Breslow et al., issued Dec. 10, 1963. Catalyst destruction and removal from the reaction product is conventionally effected by adding water and filtering. However, when the hydrogenation is carried out with a trihydrocarbylaluminum-reduced organonickel compound separation of catalyst residues is difficult because of the formation of a gelatinous precipitate when water is added.

THE INVENTION

It is thus an object of the present invention to provide an improved process for the removal of hydrogenation catalyst residues from a hydrogenated polymer composition containing same.

Another object of the present invention is to provide a process for the removal of hydrogenation catalyst from solutions of polymers in a manner which avoids the formation of gels therein.

Other aspects, objects and the several advantages of this invention will be apparent from the following specification and claims.

In accordance with the present invention, I have discovered that treating a solution of a hydrogenated thermoplastic or elastomeric polymer containing trihydrocarbylaluminum-reduced organonickel hydrogenation catalyst with an aqueous phosphate solution results in a polymer-containing solution from which the catalyst residues can be readily removed.

The instant invention is particularly suitable for the removal of hydrogenation catalyst systems which are formed by mixing (a) a compound of the formula $Al(R)_3$ wherein R is hydrogen or an alkyl, cycloalkyl or aryl radical or combinations thereof having 1 to 20 carbon atoms; and (b) a compound of the formula

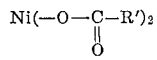

wherein R' is hydrogen or an alkyl, cycloalkyl, or aryl radical or combinations thereof having 1 to 20 carbon atoms.

Examples of compounds of the Formula (a) are triisobutylaluminum, triethylaluminum, trieicosylaluminum, dicyclohexyl(phenyl)aluminum, aluminum hydride, trimethylaluminum, dibenzylaluminum hydride, tolylaluminum dihydride, trimethylcyclopentylaluminum, tri(4-tetradecylcyclohexyl)aluminum, tri(5-cyclopentylpentyl) aluminum tri(4-cyclohexylphenyl)aluminum, tri(3-phenylcyclopentyl)aluminum, and the like.

Examples of compounds of the Formula (b) are nickel stearate, nickel acetate, nickel propionate, nickel formate, nickel octoate, nickel benzoate, nickel naphthenate, nickel eicosate, the nickel esters of cyclohexanecarboxylic acid, o-toluic acid, phenylacetic acid, 4-cyclopentylbutyric acid, 3-methylcyclopentanecarboxylic acid, 4-cyclohexylbenzoic acid, 4-(1-naphthyl)cyclohexane carboxylic acid, and the like.

It is desirable to treat the hydrogenated polymer in solution, preferably while dissolved in a hydrocarbon solvent such as paraffins, cycloparaffins or aromatics or any mixture of these materials. Examples of suitable solvents include n-pentane, n-octane, cyclohexane, benzene, toluene, and the like or mixtures of these. The polymer concentration in the solvent can vary over the range of 1 to 50 weight percent although concentrations of about 5 to 25 weight percent are preferred.

The process of this invention is applicable in the separation of the metals contained in organometal catalyst systems as defined above used in the hydrogenation of any elastomeric or thermoplastic polymer having residual unsaturation therein such as 2 to 8 carbon olefin homopolymers and copolymers, polymers of dienes such as butadiene polymers, copolymers of conjugated dienes and aromatic compounds such as butadiene/styrene copolymers, and the like. A presently preferred use of the process of this invention is for the treatment of hydrogenated butadiene-styrene copolymers having a molecular weight in the approximate range of 25,000 to 125,000, a now preferred range of about 30,000 to 75,000. Such copolymers contain from about 30 to about 44 parts by weight butadiene per 100 parts by weight of total monomer.

Such presently preferred copolymers can be prepared by any of the conventional techniques known in the art, such as those described in U.S. Pat. 2,975,160, Zelinski, issued Mar. 14, 1961. For example, a mixture of butadiene and styrene monomers can be polymerized using butyllithium as a catalyst and tetrahydrofuran as a randoming agent. Likewise, the hydrogenation can be carried out in any manner known in the art. For example, the copolymer can be hydrogenated over a nickel octoate-triethylaluminum system.

The resulting hydrogenated copolymer as well as the other hydrogenated polymers of the present invention are preferably polymers which have been sufficiently hydrogenated to remove substantially all of the olefinic unsaturation.

In carrying out the process of this invention, the polymeric composition such as the butadiene-styrene copolymer as above described is contacted in solution with the hydrogenation catalyst under conditions which include temperatures in the range of about 50 to 500° F. and gauge pressures up to about 1000 pounds per square inch. The reaction time can vary from 1 minute to 25 hours or more and the reaction can be either a batch or continuous operation. Preferred conditions are temperatures of 170 to 400° F., pressures of 10 to 500 pounds per square inch gauge and reaction times of about 3 minutes to 10 hours. When treating the polymer in solution the pressure is usually that sufficient to maintain the reaction mixture substantially in the liquid phase.

In treating the hydrogenated polymers, any ammonium phosphate—e.g., meta, monobasic, or dibasic—in aqueous solution or partially or completely ammonia-neutralized aqueous solution of phosphoric acid can be used, optionally in the presence of excess ammonia. The pH of the solution used is greater than 5, preferably greater than 6, and the $PO_4^{-3}$ ion content is in the range of 5 to 50 weight percent. For example, commercial phosphate solution such as 9:30:0 or 10:34:0 materials can be used. These solutions have $PO_4^{-3}$ contents of about 40 and about 46 weight percent, and $NH_3$ contents of about 11 and about 12 weight percent, respectively, and a pH of about 6.2.

Following the treating of the polymer solutions with the aqueous ammonium phosphate solution, the precipitated catalyst residues can be separated from the solution by any means known in the art for the separation of precipitates, and is conveniently carried out by filtration.

The following example will further illustrate the invention but is not intended as a limitation thereof.

EXAMPLE

A 62 styrene/38 butadiene random copolymer was prepared using the following recipe and conditions:

| | Parts by weight |
|---|---|
| Cyclohexane | 663 |
| Butadiene | 38 |
| Styrene | 62 |
| Tetrahydrofuran | 1.5 |
| n-Butyllithium | 0.15 |

Charge order was: one-half solvent, tetrahydrofuran, butadiene, styrene, rest of solvent, n-butyllithium. The reaction mixture was heated to 130° F. just before adding the n-butyllithium, and the temperature rose to 215° F. 5 minutes after adding initiator. Total reaction time was 20 minutes. Reaction pressure was 45 p.s.i.g. on initiation, and the pressure rose to 65 p.s.i.g. during reaction.

The cooled cement (140° F.) which had a solids content of about 13 weight percent, was mixed with 0.27 part per 100 parts of polymer of a nickel octoate/triethylaluminum mixture having a nickel to aluminum mol ratio of 2/1, and was preheated to 292° F. and hydrogenated by trickling over a bed of ¼-inch ceramic berl saddles under 300 p.s.i.g. hydrogen pressure. Hydrogenation temperature was 355° F. and residence time was 4 minutes. There was no ring hydrogenation and complete hydrogenation of the acyclic olefinic bonds.

An ammonium phosphate solution was prepared by dissolving 454 grams of dibasic ammonium hydroxide in 225 ml. of concentrated ammonium hydroxide (28 weight percent ammonia) and diluting with deionized water to a total weight of 1600 grams (about 20 weight percent $PO_4^{-3}$ ion). A 1000-gram portion of this solution was mixed with 30 gallons of the resulting hydrogenated polymer cement containing 30 pounds of hydrogenated polymer and the resulting mixture then filtered to remove precipitated nickel and aluminum phosphates. Filtration rate of this mixture was compared with that of a similar cement treated with water to precipitate the catalyst ingredients:

| Precipitant | Filtration Results |
|---|---|
| Ammonium phosphate solution | Filtration rate was greater than 45 lb. of cement per square foot of filter area per hour, with a pressure drop across the filter of 2 p.s.i. There was no increase in pressure drop over a 1-hour period. |
| Water | Filtration rate was 7 lb. of cement per square foot of filter area per hour, and the pressure drop across the filter built up to 30 p.s.i. in 20 minutes. |

The above data clearly demonstrate that improved filtration of the polymer cement is achieved by treating the hydrogenated polymer cement with an aqueous phosphate solution in accordance with the present invention.

Reasonable variations and modifications of this invention can be made, or followed, in view of the foregoing disclosure, without departing from the spirit or scope thereof.

I claim:
1. A process for separating a hydrogenation catalyst formed by mixing of (a) a compound of the formula $Al(R)_3$ wherein R is hydrogen or an alkyl, cycloalkyl or aryl radical or combinations thereof having 1 to 20 carbon atoms; and (b) a compound of the formula

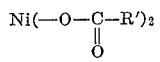

wherein R′ is hydrogen or an alkyl, cycloalkyl, or aryl radical or combinations thereof having 1 to 20 carbon atoms from a solution containing said hydrogenation catalyst and from 1 to 50 weight percent of a hydrogenated polymer in a hydrocarbon solvent which comprises contacting said solution with an aqueous solution containing phosphate ($PO_4^{-3}$) and ammonium ($NH_4^+$) ions, the pH of the solution being greater than 5 and the ($PO_4^{-3}$) ion content in the range of 5 to 50 weight percent, and thereafter separating the resulting nickel and aluminum phosphates from said solution.

2. A process according to claim 1 wherein said polymer is a butadiene-styrene copolymer having a molecular weight in the range of 25,000 to 125,000.

3. A process according to claim 2 wherein said polymer is dissolved in cyclohexane.

4. A process according to claim 1 wherein said nickel and aluminum phosphates are separated by filtration.

5. A process according to claim 1 wherein said aqueous solution contains dibasic ammonium phosphate.

References Cited

UNITED STATES PATENTS

| 3,330,875 | 5/1967 | Cull et al. | 260—637 |
| 3,113,986 | 12/1963 | Breslow et al. | 260—677 XR |
| 3,409,599 | 11/1968 | Bauer et al. | 260—79.3 |
| 3,432,481 | 3/1969 | Webber | 260—82 |

JOSEPH L. SCHOFER, Primary Examiner

W. F. HAMMER, Assistant Examiner

U.S. Cl. X.R.

260—94.7, 96, 677